(12) United States Patent
Mazyar et al.

(10) Patent No.: US 10,344,554 B2
(45) Date of Patent: Jul. 9, 2019

(54) ARTICLE FOR REMOVING CONTAMINANTS FROM A FLUID, AND RELATED METHODS

(71) Applicant: Baker Hughes Incorporated, Houston, TX (US)

(72) Inventors: Oleg A. Mazyar, Katy, TX (US); Valery N. Khabashesku, Houston, TX (US)

(73) Assignee: Baker Hughes, a GE company, LLC, Houston, TX (US)

( * ) Notice: Subject to any disclaimer, the term of this patent is extended or adjusted under 35 U.S.C. 154(b) by 345 days.

(21) Appl. No.: 15/234,321

(22) Filed: Aug. 11, 2016

(65) Prior Publication Data

US 2016/0348462 A1     Dec. 1, 2016

Related U.S. Application Data

(62) Division of application No. 14/140,053, filed on Dec. 24, 2013, now Pat. No. 9,428,985.

(51) Int. Cl.
| | |
|---|---|
| *B29C 44/02* | (2006.01) |
| *C09K 8/44* | (2006.01) |
| *E21B 33/12* | (2006.01) |
| *E21B 23/06* | (2006.01) |
| *B29C 44/34* | (2006.01) |
| *C09K 8/42* | (2006.01) |
| *B29C 44/00* | (2006.01) |
| *B29L 31/26* | (2006.01) |
| *B29L 31/14* | (2006.01) |

(Continued)

(52) U.S. Cl.
CPC .......... *E21B 33/1208* (2013.01); *B29C 44/02* (2013.01); *B29C 44/3484* (2013.01); *C09K 8/424* (2013.01); *C09K 8/44* (2013.01); *E21B 23/06* (2013.01); *E21B 33/12* (2013.01); *B29C 44/005* (2013.01); *B29K 2009/00* (2013.01); *B29K 2509/04* (2013.01); *B29L 2031/14* (2013.01); *B29L 2031/265* (2013.01)

(58) Field of Classification Search
None
See application file for complete search history.

(56) References Cited

U.S. PATENT DOCUMENTS

| | | |
|---|---|---|
| 5,606,056 A | 2/1997 | Kouvetakis et al. |
| 2004/0020662 A1 | 2/2004 | Freyer |

(Continued)

FOREIGN PATENT DOCUMENTS

WO     2007019585 A2     2/2007

OTHER PUBLICATIONS

Written Opinion of the International Searching Authority, dated Apr. 20, 2015, PCT/US2014/072086 (Year: 2015).*

(Continued)

*Primary Examiner* — Allison G Fitzsimmons
(74) *Attorney, Agent, or Firm* — TraskBritt

(57) ABSTRACT

A swellable downhole article includes a swellable material and a carbon nitride material. The swellable material may include at least one of an elastomeric material and an absorbent material. The carbon nitride material may remove cations from a downhole fluid. Methods of forming the swellable downhole article are also disclosed, as are methods of forming a carbon nitride containing material for removing contaminants from a fluid.

17 Claims, 4 Drawing Sheets

(51) Int. Cl.
*B29K 9/00* (2006.01)
*B29K 509/04* (2006.01)

(56) References Cited

U.S. PATENT DOCUMENTS

| | | |
|---|---|---|
| 2009/0084550 A1 | 4/2009 | Korte et al. |
| 2011/0094746 A1 | 4/2011 | Allison et al. |
| 2012/0175134 A1 | 7/2012 | Robisson et al. |
| 2013/0126185 A1 | 5/2013 | Mazyar |
| 2013/0126190 A1 | 5/2013 | Mazyar et al. |
| 2013/0146312 A1 | 6/2013 | Gerrard et al. |
| 2015/0176363 A1 | 6/2015 | Mazyar et al. |

OTHER PUBLICATIONS

International Preliminary Report on Patentability for International Application No. PCT/US2014/072086, dated Jun. 28, 2016, 11 pages.
International Search Report for International Application No. PCT/US2014/072086 dated Apr. 20, 2015, 3 pages.
International Written Opinion for International Application No. PCT/US2014/072086 dated Apr. 20, 2015, 10 pages.
Khabashesku et al., Carbonitride Nanomaterials, Thin Films, and Solids, Advanced Engineering Materials, vol. 4, No. 9, (2002), pp. 671-675.
Khabashesku et al., Powder Synthesis and Characterization of Amorphous Carbon Nitride, Chem. Mater., vol. 12, (2000), pp. 3264-3270.
Zimmerman et al., Synthesis of Spherical Carbon Nitride Nanostructures, Nano Letters, vol. 1, No. 12, (2001), pp. 731-734.

* cited by examiner

ARTICLE FOR REMOVING CONTAMINANTS FROM A FLUID, AND RELATED METHODS

CROSS-REFERENCE TO RELATED APPLICATION

This application is a divisional of U.S. patent application Ser. No. 14/140,053, filed Dec. 24, 2013, now U.S. Pat. No. 9,428,985 issued Aug. 30, 2016, the disclosure of which is hereby incorporated herein in its entirety by this reference.

TECHNICAL FIELD

Embodiments of the disclosure relate generally to materials for removing contaminants from a fluid and methods of forming such materials. More particularly, embodiments of the disclosure relate to downhole structures including a carbon nitride material for removing contaminants from a fluid and methods of forming downhole articles including carbon nitride materials and a swellable material.

BACKGROUND

The drilling of wells for oil and gas production conventionally employs longitudinally extending sections or so-called "strings" of drill pipe to which, at one end, is secured a drill bit of a larger diameter. After a selected portion of the borehole has been drilled, the borehole is usually lined or cased with a string or section of casing or liner. Such a casing or liner exhibits a larger diameter than the drill pipe used to drill the borehole, and a smaller diameter than the drill bit. Conventionally, after the casing or liner string is placed in the borehole, the string is cemented into place.

Tubular strings, such as drill pipe, casing, or liner, may be surrounded by an annular space between the exterior wall of the pipe and the interior wall of the well casing or the borehole wall, for example. Frequently, it is desired to seal such an annular space between upper and lower portions of the well depth. The annular region may be sealed with a downhole article that seals the annular space, such as between a casing wall and a tubular component, such as a length of production tubing. Swellable packers are particularly useful for sealing an annular space because they swell (e.g., expand) upon exposure to wellbore fluids and fill the cross-sectional area of the annular space in response to contact with one or more downhole fluids. Such materials that swell upon exposure to a fluid without negatively affecting the properties of the material are referred to herein as "swellable materials."

However, contaminants such as metallic cations within the wellbore fluid may negatively affect the operation of swellable materials. For example, cations within the wellbore fluid may increase the amount of time it takes for a swellable material to fully expand, may decrease the total amount of swelling of the swellable material, and may accelerate degradation of the swellable material.

In the subterranean hydrocarbon (i.e., oil and gas), as well as geothermal drilling and completion industries, fluids containing contaminants (referred to in the industry as flowback fluids) often may return to the surface. Because the flowback fluids contain contaminants, environmental regulations often require that the flowback fluids be treated before they are discharged or reused.

It would, therefore, be desirable to have improved methods of removing contaminants from both wellbore fluids and flowback fluids. It would also be desirable to have improved methods of forming a swellable downhole article for sealing an annular space within the interior of a wellbore in the presence of cations.

BRIEF SUMMARY

In some embodiments, the disclosure includes a swellable downhole article that includes a swellable material having an inner diameter configured for receiving an outer diameter of a portion of a tubular component for disposition in a borehole. The swellable material comprises at least one of an elastomeric material and an absorbent material. The swellable downhole article includes a carbon nitride material configured for removing cations from a wellbore fluid.

In additional embodiments, a method of forming a swellable downhole article is disclosed. The method includes forming a swellable material comprising at least one of an elastomeric material and an absorbent material, the swellable material formulated and configured to expand from an initial state to a swollen state upon contacting a wellbore fluid. A carbon nitride material is provided within the swellable downhole article.

In additional embodiments, a method of forming a material for removing contaminants from a fluid comprises forming a carbon nitride material to have a structure comprising vacancies between triazine rings of the carbon nitride material. The carbon nitride material is admixed with at least one of an elastomeric material, polyurethane, polyurea, polyamine, carbon black, graphite, carbon fiber, glass fiber, silica, clays, calcium carbonate, bentonite, polytetrafluoroethylene, and molybdenum disulfide. At least one of a filter and a membrane is formed from the carbon nitride material. The at least one of a filter and a membrane comprises from between about fifteen percent by weight to about thirty-five percent by weight of the carbon nitride material.

BRIEF DESCRIPTION OF THE SEVERAL VIEWS OF THE DRAWINGS

While the specification concludes with claims particularly pointing out and distinctly claiming what are regarded as embodiments of the invention, the advantages of embodiments of the disclosure may be more readily ascertained from the following description of certain embodiments of the disclosure when read in conjunction with the accompanying drawings, in which:

DETAILED DESCRIPTION

Illustrations presented herein are not meant to be actual views of any particular material, component, or system, but are merely idealized representations that are employed to describe embodiments of the disclosure. Elements common between figures may retain the same numerical designation.

The following description provides specific details, such as material types, compositions, material thicknesses, and processing conditions in order to provide a thorough description of embodiments of the disclosure. However, a person of ordinary skill in the art will understand that the embodiments of the disclosure may be practiced without employing these specific details. Indeed, the embodiments of the disclosure may be practiced in conjunction with conventional techniques employed in the industry. Only those process acts and structures necessary to understand the embodiments of the disclosure are described in detail below. Additional acts to form a complete swellable downhole article or a material to remove contaminants may be performed by conventional techniques.

A carbon nitride material may bind contaminants from process fluids such as wellbore fluids and flowback fluids. In some embodiments, the carbon nitride material binds cations within a wellbore fluid, to mitigate the negative effects of such cations on swellable materials. The carbon nitride material may be integrated into a swellable downhole article to bind cations within wellbore fluids and protect the swellable material from being damaged by the cations in the wellbore fluid. In other embodiments, the carbon nitride material may be used to purify fluids prior to discharging the flowback fluids to underground injection wells or back to surface water systems.

Figure 1A:
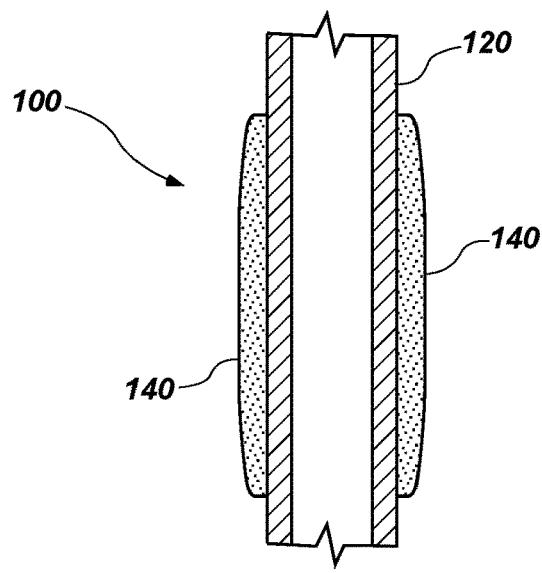
FIG. 1A is a cross-sectional side view of a swellable downhole article including a swellable material that may include carbon nitride.

An embodiment of a swellable downhole article 100 including a swellable material 140 is shown in FIG. 1A. The swellable material 140 may surround a section of a tubular component 120 within a wellbore. The tubular component 120 may be a portion of a downhole casing or liner string, production pipe or tubing, or other tubular component within the wellbore. The swellable material 140 may be activated to swell based on the properties of the components of the swellable material 140. Because the swellable material 140 expands after exposure to wellbore fluids, in an initial state, the swellable material 140 may be placed on tubular component 120 in an initial un-swollen configuration in which the swellable material 140 has a smaller diameter than the diameter of wall 105 of borehole 160 (FIG. 1B).

Figure 1B:
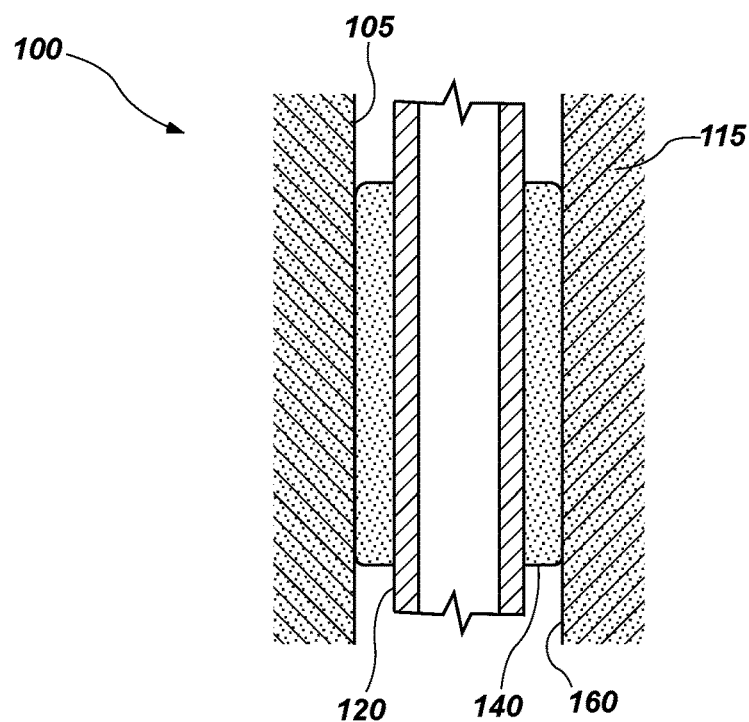
FIG. 1B is a cross-sectional side view of the swellable downhole article of FIG. 1A showing the swellable material in an expanded state.

Referring to FIG. 1B, the swellable material 140 is shown in the swollen (e.g., expanded) state. Exposure to a wellbore fluid causes the swellable material 140 to expand and engage the wall 105 of borehole 160, thereby forming a compression seal between the tubular component 120 and the wall 105. Thus, the outer diameter of the swellable material 140 may increase until it contacts the wall 105 of borehole 160 within subterranean formation 115. In other embodiments, an inner wall of tubing, casing, liner, or other surface may be a downhole structure engaged by the swellable material 140 surrounding tubular component 120. Thus, an annulus between an outer downhole structure such as a subterranean formation 115 or larger, outer tubular component (e.g., borehole 160) and a smaller, inner tubular component 120 may be isolated by expansion of the swellable material 140 such that fluids (e.g., from formation 115) are substantially prevented from flowing past the swellable material 140 once the swellable material 140 is expanded. As indicated above, the swellable material 140 may be used in either open borehole structures or cased or lined borehole structures.

The swellable material 140 may include one or both of an elastomeric material and an absorbent material. The elastomeric material may comprise any swellable or non-swellable material. In some embodiments, the elastomeric material is absorbent with respect to one or more downhole fluids.

The elastomeric material may include a rubber material such as natural rubber or a synthetic rubber copolymer. In some embodiments, the elastomeric material may include acrylonitrile butadiene styrene (ABS), polyacrylonitrile (PAN), a nitrile-based elastomer, such as acrylonitrile butadiene rubber (NBR, also known as Buna-N or Purbunan), and combinations thereof. The elastomer may comprise various grades of NBR such as hydrogenated acrylonitrile butadiene rubber (HNBR), carboxylated acrylonitrile butadiene rubber (XNBR), carboxylated hydrogenated acrylonitrile butadiene rubber (XHNBR), and combinations thereof. The elastomeric material may also comprise fluorinated polymer rubbers, tetrafluoroethylene propylene rubbers, fluorosilicone rubber, butyl rubbers, and combinations thereof.

The elastomeric material may be crosslinked. The crosslinks may include sulfur, peroxide, urethane, metallic oxides, boron oxide, acetoxysilane, alkoxysilanes and combinations thereof. In some embodiments, the crosslink is a sulfur or a peroxide crosslink.

The swellable material 140 may include one or more absorbent materials that are compatible with the elastomeric material. The absorbent material may increase the swellability of the swellable material 140. In some embodiments, an acrylate polymer or acrylate copolymer (AC) may be added to the elastomeric material. The AC may comprise a mixture comprising from between about twenty-five percent by weight (25 wt. %) to about seventy-five percent by weight (75 wt. %) of an active polymer and from between twenty-five percent by weight (25 wt. %) to about seventy-five percent by weight (75 wt. %) of a phthalate ester. In one embodiment, the AC comprises about fifty percent by weight (50 wt. %) active polymer and fifty percent by weight (50 wt. %) of a phthalate ester. Non-limiting examples of the active polymer include copolymers of acrylic acid and its esters, polyacrylamide copolymer, ethylene maleic anhydride copolymers, polyvinyl alcohol copolymers, crosslinked polyethylene oxide, a copolymer of polyacrylonitrile (PAN), an ethylene propylene diene monomer (EPDM), methyl acrylate, ethyl acrylate, butyl acrylate, acrylic acid alkylester, and combinations thereof.

The absorbent material may also include a cellulose material. In some embodiments, the cellulose material is carboxy methyl cellulose (CMC). The CMC may comprise a dry powder and the AC may be a liquid mixture. Adding an AC and the CMC material to the elastomeric material may increase the total swellability of the swellable material 140 more than adding each of the AC and the CMC individually to the swellable material 140. In some embodiments, the swellable material 140 may comprise from about fifteen percent by weight (15 wt. %) to about thirty-five percent by weight (35 wt. %) of each of the elastomeric material, the AC, and the CMC.

The swellable material 140 may further comprise other additives including filler materials, activators, antioxidants, process aids, curatives, and accelerators. Suitable filler materials include carbon black, carbon fiber, glass fiber, silica, clays, calcium carbonate, bentonite, polytetrafluoroethylene (PTFE), molybdenum disulfide ($MoS_2$), graphite, and combinations thereof. The filler material may range from between about 30 parts per hundred rubber (phr) to about 100 phr. The activator may include magnesium oxide, zinc oxide, zinc stearate, stearic acid, and combinations thereof and may range from between about 1 phr to about 10 phr. The antioxidant may include a diphenyl amine, a mercaptobenzimidazole, and combinations thereof. The process aids may include a wax, an oligomer, a resin, a fluorocarbon, stearic acid, low molecular weight polyethylene, and combinations thereof. The antioxidants and the process aids may range from between about 0.5 phr to about 5.0 phr. Curatives may include sulfur, peroxide, acrylate esters, methacrylate esters, dimaleimides, allyl-containing cyanurates, isocyanurates (e.g., triallyl isocyanurate (TAIC)), phthalates, and combinations thereof. The accelerators may include mercapto compounds such as 2-mercaptobenzothiazole (MBT) and mercaptobenzothiazyl disulfide (MBTS), sulfonamides such as benzothiazyl-2-t-butyl sulfonamide (TBBS), and thiurams such as tetramethyl thiuram disulfide (TMTD). The curatives and accelerators may range from between about 0.2 phr to about 3.0 phr.

The swellable material 140 may be formed by mixing the elastomeric material with the absorbent material to form a composition. In some embodiments, other additives such as fillers, activators, antioxidants, process aids, curatives, and accelerators may be added to the composition. The components of the swellable material 140 may be blended or compounded by conventional methods. For example, the absorbent material including AC and CMC may be emulsified in a nitrile soluble oil and mixed with the elastomeric material. The oil may include a paraffinic-based oil, a naphthenic-based oil, an aromatic-based oil, a phthalate ester, and combinations thereof. The composition may be mixed in a mill mixer, a banbury mixer, or other mixer. The resulting material may be cured and formed into a desired shape, such as by extruding or pressing. In some embodiments, the composition may be formed as a ring with an internal diameter sized and configured for receiving a tubular component (e.g., tubular component 120) therethrough.

The composition described above may form the swellable material 140 and may swell upon exposure to a wellbore fluid. However, wellbore fluids often contain heavy metals and other contaminants that may increase the time for the swellable material 140 to swell or decrease the total amount of swelling of the swellable material 140.

For example, wellbore fluids may include an aqueous component such as a brine solution containing various ions formed from dissolved salts. The cations may include cations of cations of barium ($Ba^{2+}$), cations of chromium ($Cr^{2+}$, $Cr^{3+}$), cations of copper ($Cu^+$, $Cu^{2+}$), cations of iron ($Fe^{2+}$, $Fe^{3+}$), cations of potassium ($K^+$), cations of magnesium ($Mg^{2+}$), cations of manganese ($Mn^{2+}$), cations of molybdenum ($Mo^{2+}$), cations of sodium ($Na^+$), cations of nickel ($Ni^{2+}$), cations of lead ($Pb^{2+}$, $Pb^{4+}$), cations of titanium ($Ti^{3+}$), cations of zinc ($Zn^{2+}$), sulfate ions ($SO_4^{2-}$), other metal ions, and combinations thereof. To mitigate the negative effects of cations in the wellbore fluid on the swellable material 140, a carbon nitride material may bind the cations dispersed within the wellbore fluid.

In general, higher concentrations of cations in the wellbore fluid may slow the rate of swelling and lower the total amount of swelling of the swellable material 140. In addition to reducing the amount of swelling of the swellable material 140, cations such as $Zn^{2+}$ in the wellbore fluid may damage and degrade the swellable material 140 and may eventually break the seal between the swellable material 140 and the borehole 160, between the swellable material 140 and the tubular component 120, or both.

The concentration of cations in the wellbore fluid contacting the swellable material 140 may be reduced by incorporating a carbon nitride material into the swellable downhole article 100. The carbon nitride material may bind cations within the wellbore fluid, thereby mitigating the negative effects of the cations on the swellable material 140. The carbon nitride material may be formed as an integral part of swellable material 140, may be formed as a filter or membrane through which the wellbore fluid travels prior to contacting the swellable material 140, and combinations thereof.

One advantage of using a carbon nitride material to bind cations within a fluid is the ability of the carbon nitride material to withstand high pressure and high temperature environments, such as those encountered downhole. For example, carbon nitride may withstand temperatures up to approximately 400° C., such as between about 350° C. and about 400° C. Other materials that may remove contaminants from a wellbore fluid, such as functionalized graphenes, may be sensitive to higher temperatures. For example, such materials may lose functionality at temperatures of approximately 180° C. and higher.

The carbon nitride material may comprise a $C_3N_4$ polymer material. The $C_3N_4$ may be an amorphous carbon nitride or a graphitic carbon nitride. In one embodiment, the $C_3N_4$ structure is a graphitic carbon nitride having a spherical shape. Generally, the carbon nitride material may have a chemical structure as shown below, where nitrogen atoms form bridges between adjacent triazine structures.

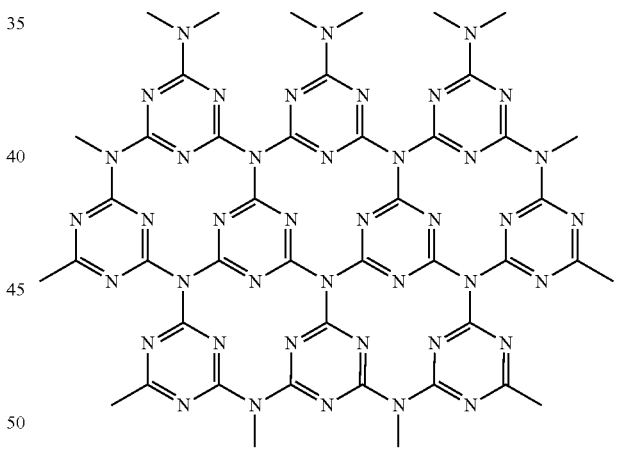

The carbon nitride of the $C_3N_4$ carbon nitride structure may include s-triazine rings (i.e., 1,3,5-triazine) bridged together by nitrogen atoms between adjacent triazine rings. The geometry of the $C_3N_4$ carbon nitride structure may not be planar but may be substantially spherical, similar to buckminsterfullerene structures. The carbon nitride may be formed as spherical structures with diameters ranging from between about 30 nm to about 2,000 nm. In some embodiments, the carbon nitride may have an average particle diameter of between about 100 nm and about 1,000 nm. The $C_3N_4$ structure may result in a multi-walled structure. Adjacent walls of the multi-walled structure may be separated by between about 3 Å and about 4 Å. In some embodiments, the distance between adjacent walls of the multi-walled structures may be about 3.415 Å.

The graphitic carbon nitride structure may inherently include vacancies (e.g., voids) that may act as sites for binding contaminants dispersed within a fluid. For example, the carbon nitride may bind metal cations in the vacancies that are inherently formed in the middle of triangular shaped openings formed by nitrogen atoms bridging adjacent triazine rings. Thus, the carbon nitride may effectively remove contaminants without the need to functionalize the carbon nitride. In some embodiments, cations bound within an outer layer of a multi-walled carbon nitride structure may be moved from an outer wall to an inner wall of the carbon nitride structure.

The carbon nitride may be formed through a variety of chemical reactions. For example, the carbon nitride may be formed by the polymerization of cyanamide ($CH_2N_2$), dicyanamide ($C_2H_4N_4$), or melamine ($C_3H_6N_6$) or by the pyrolysis of melamine. In some embodiments, the carbon nitride is formed by chemical vapor deposition (CVD) with a carbon containing precursor and a nitrogen containing precursor. The carbon containing precursor may include methane, ethane, s-triazine rings, and combinations thereof. The nitrogen containing precursor may include ammonia, nitrogen gas, s-triazine rings, and combinations thereof. In other embodiments, the carbon nitride is formed by reacting lithium nitride ($Li_3N$) with cyanuric chloride ($C_3N_3Cl_3$) or cyanuric fluoride ($C_3N_3F_3$) to form $C_3N_4$ and a lithium chloride salt or lithium fluoride salt.

The carbon nitride may be more effective at removing cations at a neutral pH than at a low pH. The carbon nitride may capture cations from a fluid at a pH ranging from between about 6.0 to about 8.0. In some embodiments, the carbon nitride may capture contaminants from a fluid having a pH of about 7.0. Since the carbon nitride captures more ions at a neutral pH, exposing the carbon nitride to a lower pH may release cations bound within the carbon nitride structure. Thus, as the vacancies of the carbon nitride become saturated with bound cations, the carbon nitride may be regenerated to free vacancies within the structure. In some embodiments, the carbon nitride is regenerated by exposing the carbon nitride to a low pH, thereby freeing bound cations within the carbon nitride. Then, the fluid surrounding the carbon nitride may be purged from around the carbon nitride and the carbon nitride may continue to capture cations within a fluid.

To further increase the ability of the carbon nitride to capture and bind the contaminants of a fluid, the carbon nitride may be functionalized. For example, the graphitic carbon nitride structure may include terminal amino groups and hydroxyl groups at ends of the structure. These terminal amino and hydroxyl groups may be functionalized to alter the chemical or physical properties of the carbon nitride. In some embodiments, the terminal groups may be replaced with a hydrophilic or a hydrophobic group to make the carbon nitride hydrophobic or hydrophilic. In other embodiments, the terminal groups may be functionalized with other materials that may increase the compatibility of the carbon nitride material with the elastomeric material of the swellable material 140. For example, the carbon nitride may be functionalized with alkyl groups, vinyl groups, epoxide groups, silane groups, carboxyl groups, pyridine groups, phenolic groups, and combinations thereof.

In some embodiments, a swellable material 140 may include a carbon nitride material. The swellable material 140 may be comprised of a homogeneous composition with the elastomeric material and the absorbent material. In some embodiments, carbon nitride may be mixed with the elastomeric material, the absorbent material, and any other additives to form a composition. The carbon nitride may be compatible with the composition of the swellable material 140. For example, in some embodiments, carbon nitride may be added to the composition of the swellable material 140. The carbon nitride may replace at least a portion of a filler material in the swellable material 140. Thus, in some embodiments, the swellable material 140 may also be free of carbon black filler material. The elastomeric material, the absorbent material, the carbon nitride, and any other additives may be emulsified in a nitrile soluble oil. The composition may be dried, extruded, and pressed into a desired shape or form. Thus, the carbon nitride material may be homogeneously incorporated into the swellable material 140. The swellable material 140 may comprise from between about fifteen percent by weight (15 wt. %) to about thirty-five percent by weight (35 wt. %) carbon nitride.

In other embodiments, the swellable material 140 may be formed by combining the elastomeric material, the absorbent material, and at least one additive to form a composition. The composition may be extruded and shaped into a desired shape to form the swellable material 140. Then, the swellable material 140 may be coated with carbon nitride to encapsulate the swellable material 140 with carbon nitride. For example, the carbon nitride may be mixed with an oil and then coated onto the swellable material 140 and allowed to dry.

Figure 2:
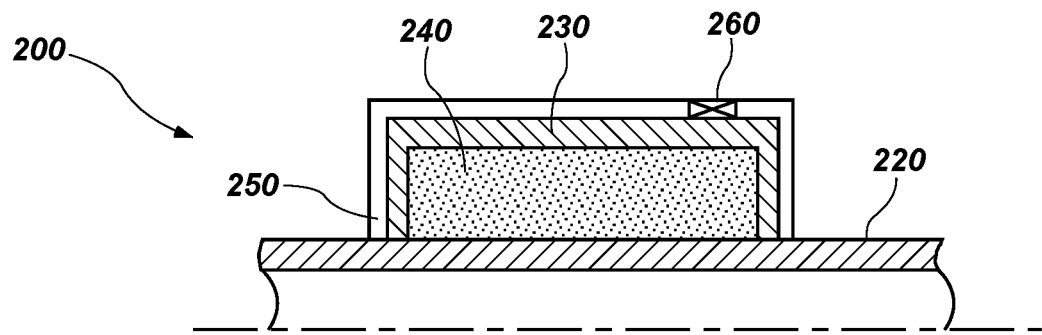
FIG. 2 is a cross-sectional side view of a swellable downhole article including a swellable material surrounded by a shell that may include carbon nitride.

Referring to FIG. 2, a cross-sectional view of a swellable downhole article 200 bearing a tubular component 220 is shown. A swellable material 240 may surround an outer diameter of the tubular component 220. The swellable downhole article 200 may also include a shell 230 comprising a carbon nitride material at least partially surrounding the swellable material 240. The carbon nitride material of the shell 230 may be bound together by reacting terminal amino groups of the carbon nitride with polyurethane, polyurea, a polyamine, or combinations thereof. The swellable material 240 may also comprise a carbon nitride material as described above.

The swellable downhole article 200 may be configured such that any wellbore fluid passes through the shell 230 prior to contacting the swellable material 240. Because the shell 230 may be comprised of a carbon nitride material, cations in the wellbore fluid may be removed prior to the wellbore fluid contacting the swellable material 240.

In some embodiments, a coating 250 may be formed on the outer surface of the shell 230. The coating 250 may comprise an elastomer that is substantially impermeable to the wellbore fluid and may protect the swellable material 240 and carbon nitride material of the shell 230 from premature contact with wellbore fluid during run-in procedures.

An valve or other openable orifice 260 may penetrate the coating 250 to control fluid communication to the carbon nitride material of the shell 230 and to the swellable material 240. The openable orifice 260 may be a needle valve plugged with a degradable material, a water-soluble polymer, or a controlled electrolytic material (CEM) such as magnesium or alloys thereof. The CEM may be controllably dissolved by contacting wellbore fluids or may be removed by an electrochemical reaction. After the CEM coating is removed from the openable orifice 260, wellbore fluid flows through the openable orifice 260, and the carbon nitride of the shell 230 binds cations located in the wellbore fluid.

Figure 3:
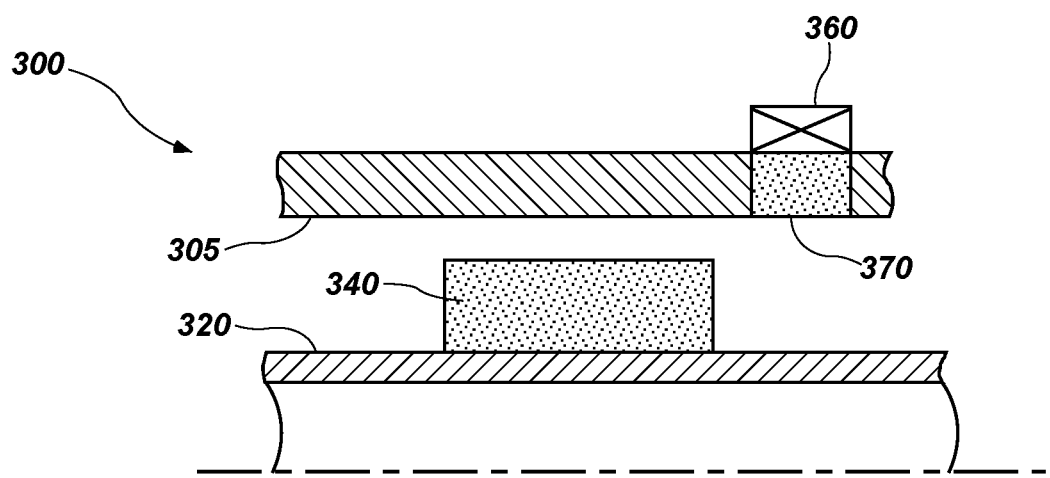
FIG. 3 is a cross-sectional side view of a swellable downhole article including a swellable material and a filter material that may include carbon nitride.

Referring to FIG. 3, in another embodiment, a swellable downhole article 300 may include a tubular component 320. A swellable material 340 may surround an outer diameter of the tubular component 320. The swellable downhole article 300 may include a filter 370 comprised of carbon nitride. The carbon nitride may be in the form of sheets, nanosheets, spheres, flakes, pellets, powder, or other suitable form. The carbon nitride of the filter 370 may be bound together by reacting terminal amino groups of carbon nitride with polyurethane, polyurea, a polyamine, or combinations thereof during their curing. The filter 370 may remove or filter ions from the wellbore fluid before the wellbore fluid contacts the swellable material 340.

The swellable downhole article 300 may include a valve or openable orifice 360 similar to valve or openable orifice 260 described above with reference to FIG. 2. The openable orifice 360 may control the flow of fluid through the filter 370 and to the swellable material 340. The openable orifice 360, when open, may create a passageway for communicating fluid to the filter 370 and through the filter 370 to the swellable material 340. Thus, the flow of wellbore fluid may be filtered of ions by the filter 370 before reaching the swellable material 340. The swellable material 340 may expand to contact wall 305 after being contacted by the filtered wellbore fluid.

Figure 4A:
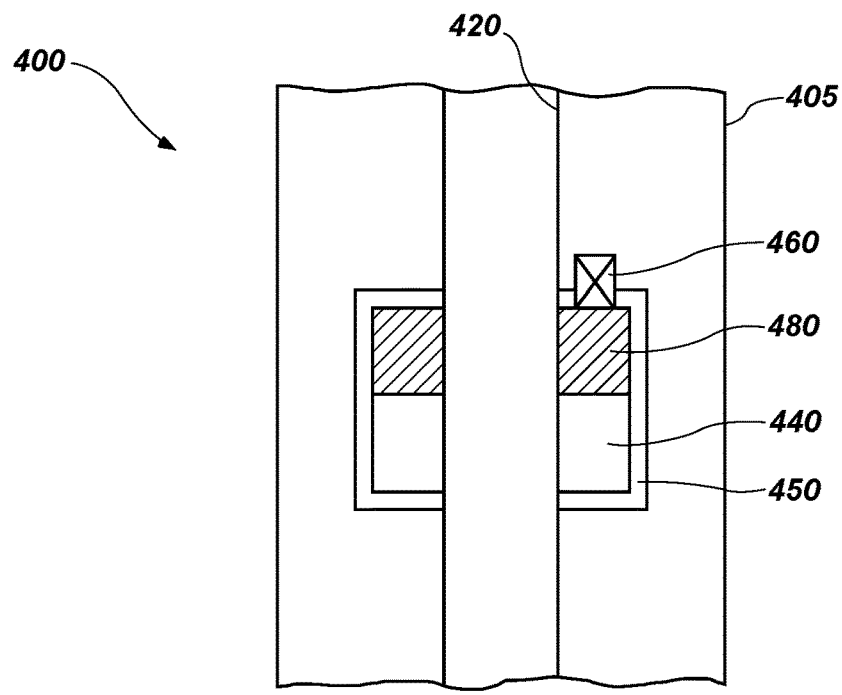
FIG. 4A is a cross-sectional side view of a swellable downhole article including a swellable material and a membrane material that may include carbon nitride.

Referring to FIG. 4A, a swellable downhole article 400 is shown including a membrane 480 comprising carbon nitride surrounding a tubular component 420. The membrane 480 may comprise a permeable material such as a porous foam or fiber in which the carbon nitride material is dispersed. The membrane 480 may overlie a swellable material 440. A coating material 450 comprising an elastomeric material may overlie and at least partially surround the swellable material 440 and the membrane 480. A valve or other openable orifice 460 may extend through the coating material 450 to control fluid communication to the membrane 480 and the swellable material 440.

Figure 4B:
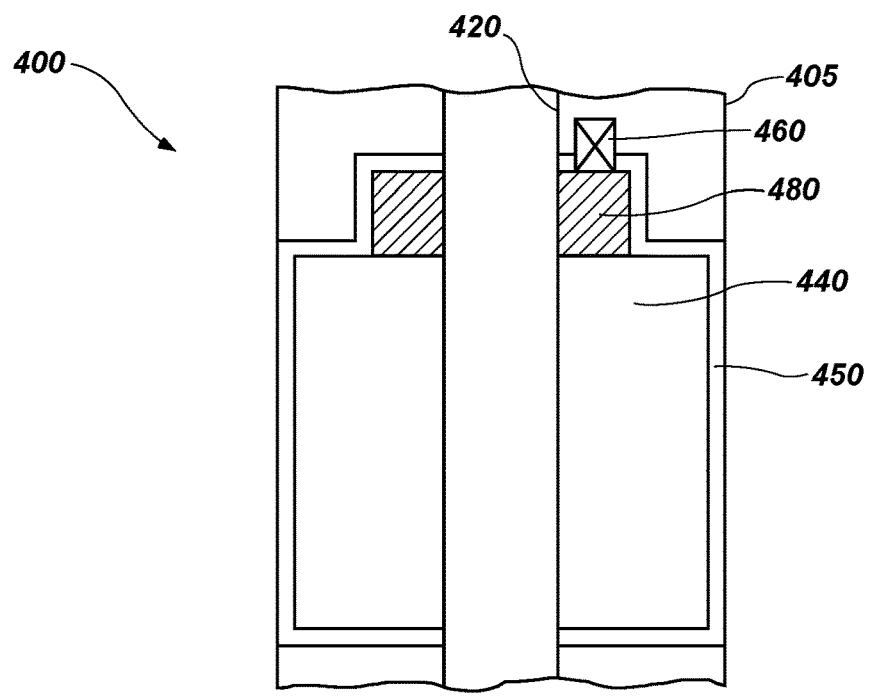
FIG. 4B is a cross-sectional side view of the downhole article of FIG. 4A showing the swellable material in an expanded state.

Referring to FIG. 4B, the swellable downhole article 400 is shown after the swellable material 440 has expanded to a swollen state. As shown, the expanded swellable material 440 may force the coating material 450 to seal against a wall 405 of a wellbore casing, liner, tubing, other downhole element, or subterranean formation.

In some embodiments, additional elements may be added to the swellable material to further remove contaminants and cations from the wellbore fluid as disclosed in, for example, one or more of U.S. patent application Ser. No. 13/646,028, filed Oct. 5, 2012, published as U.S. Patent Application Publication No. 2013/0126185, now U.S. Pat. No. 9,284,812, issued Mar. 3, 2016, and entitled SYSTEM FOR INCREASING SWELLING EFFICIENCY; and U.S. patent application Ser. No. 13/300,916, filed Nov. 21, 2011, published as U.S. Patent Application Publication No. 2013/0126190, and entitled ION EXCHANGE METHOD OF SWELLABLE PACKER DEPLOYMENT, the disclosures of which applications are incorporated herein in their entireties by this reference.

In some embodiments, at least one of an ion exchange material and a functionalized graphene may be added to the swellable material described with reference to any of FIG. 1A through FIG. 4B. The ion exchange material or the functionalized graphene may comprise discrete particles within the swellable material. Thus, the swellable material may include a homogeneous composition including an elastomeric material, an absorbent material, an ion exchange material, a functionalized graphene, additives, and combinations thereof. In other embodiments, the ion exchange material or the functionalized graphene may be formed as part of a shell 230 (FIG. 2), disposed within a filter 370 (FIG. 3), or as part of a membrane 480 (FIG. 4A) through which wellbore fluid passes prior to contacting swellable material 140, 240, 340, 440. In these embodiments, the swellable material 140, 240, 340, 440 may also include a carbon nitride material in addition to the shell 230 (FIG. 2), filter 370 (FIG. 3), or the membrane 480 (FIG. 4A). The ion exchange material and the functionalized graphene may remove additional cations that may not be removed by the carbon nitride.

The ion exchange material may be an ion exchange membrane, ion exchange resin, inorganic mineral (e.g., a zeolite, silica, alumina, titania), and combinations thereof. The ion exchange material may comprise an organic polymer that may include functional groups having charged groups. By way of non-limiting example, the functional groups may be either anionic, cationic, or combinations thereof. Non-limiting examples of anionic functional groups include sulfonic acid groups (e.g., polystyrene sulfonic acid), phosphonic acid groups, polyacrylic acid, polymaleic acid, poly(vinyl toluene sulfonic acid), poly(styrene sulfonate-co-maleic acid), poly(vinyltoluene sulfonate-co-maleic acid), poly styrene carboxylate, poly(alkylvinyl ether-co-maleic acid), sulfonated polyvinyl alcohol, poly (acrylamide-co-2-acrylamido-2-methylpropane carboxylate), poly(acrylamide-co-2-acrylamido-2-methylpropane sulfonate), poly(styrene sulfonate-co-acrylamide), poly acrylic acid, poly(styrene carboxylate-co-acrylamide), poly(2-acrylamide-2-methylpropane sulfonate-co-maleic acid), poly(styrene sulfonic acid), poly(2-acrylamido-2-methyl-1-propanesulfonic acid), salts thereof, and combinations thereof. Where the functional group includes a cationic functional group, the functional group may include a primary amino group, a secondary amino group, a tertiary amino group, a quaternary phosphonium group, a tertiary sulfonium group, alkyl pyridinium group, and combinations thereof.

The charged functional group of the organic polymer may be associated with a counter ion. The counter ion may dissociate from the charged functional group and be replaced with an ion from the wellbore fluid. The counter ion may include a hydroxide, a halide, a sulfate, a nitrate, hydrogen, or an alkali metal such as lithium, sodium, or potassium.

The ion exchange material may be selected to affect the pH of the downhole environment. For example, a polymer comprising protonated cations or a zeolite may decrease the pH of a wellbore fluid while a hydroxide counter ion may increase the pH of the wellbore fluid. Thus, in some embodiments, an ion exchange material may be selected to control the pH of the wellbore fluid and optimize the functionality of the carbon nitride. For example, the ion exchange material may control the pH of the wellbore fluid surrounding the swellable material to a range between about 6.0 and about 8.0. In one embodiment, the pH of the wellbore fluid surrounding the swellable material is about to about 7.0.

The functionalized graphene material may include a graphene, graphene oxide, graphite, graphite oxide, and combinations thereof. The functionalized graphene materials may be functionalized with thiol groups, carboxylic acid groups, carbonyl groups, disulfide groups, sulfonic acid groups, iminodiacetic acid groups, N-[5-amino-1-carboxy-(t-butyl)pentyl]iminodi-t-butylacetate groups, N-(5-amino-1-carboxypentyl)iminodiacetic acid groups, aminocaproic nitrilotriacetic acid groups, aminocaproic nitrilotriacetic acid tri-tert-butylester groups, 2-aminooxyethyliminodiacetic acid groups, quaternary ammonium groups, quaternary phosphonium groups, ternary sulfonium groups, cyclopropenylium groups, primary amino groups, secondary amino groups, tertiary amino groups, and combinations thereof.

In additional embodiments, the present disclosure includes a method of sealing an annular portion of a wellbore. The method includes forming a swellable material comprising a carbon nitride material in an annulus between a downhole article and a wall of a wellbore, binding ions of a wellbore fluid with the carbon nitride material, and contacting the swellable material with the wellbore fluid.

In other embodiments, a downhole article including a swellable material and a carbon nitride material is formed. The method includes forming a swellable material comprising at least one of an elastomeric material and an absorbent material. The swellable material may be configured to expand from an initial state to an expanded state upon contacting a wellbore fluid. The method includes forming a carbon nitride material within the swellable downhole article.

In other embodiments, a carbon nitride material may capture cations and other contaminants from fluids such as flowback fluids. The flowback fluids often contain contaminants such as uranium, arsenic, radon, mercury, radium, thorium, lead, nickel, and other heavy metals. Prior to reusing or discharging the flowback fluids, the fluids must be treated to remove the contaminants.

Contaminants from the flowback fluids may be removed by treating them with a carbon nitride material. The fluids may be treated in pits or tanks, may be treated in industrial wastewater treatment facilities, or may be treated in situ.

Figure 5:
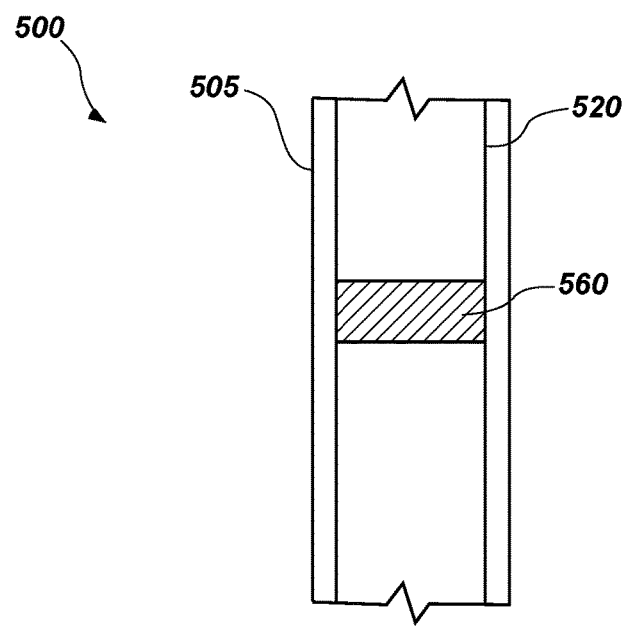
FIG. 5 is a cross-sectional side view of a system including a carbon nitride material.

Referring to FIG. 5, a flowback fluid may be treated in situ in a system 500. The system 500 may include element 560 comprising carbon nitride. Element 560 may comprise a filter, a membrane, and combinations thereof. The system 500 may be part of a wellbore or may be located in piping 505 aboveground. The element 560 may be disposed within a tubular component 520 such that any fluid travelling through the tubular component 520 passes through the carbon nitride of the element 560. The carbon nitride disposed within the element 560 may be in powder, pellet, spherical, or other form. The carbon nitride may be as described above. For example, the carbon nitride may be functionalized, may be reacted and bound together by reacting the carbon nitride with a polyurethane, polyurea, a polyamine, and combinations thereof. Although shown in only one section of tubular component 520, the element 560 may be located in a plurality of locations within system 500.

In other embodiments, a material comprising carbon nitride may be formed. The material may be useful for removing contaminants from a fluid. The method includes forming a carbon nitride material. The carbon nitride material may have a structure including vacancies that may be binding sites for capturing contaminants located within the fluid. The carbon nitride may be admixed or reacted with NBR, HNBR, XNBR, XHNBR, ABS, PAN, polyurethane, polyurea, a polyamine, and combinations thereof to bind the carbon nitride material together. Other additives may be added to the carbon nitride material, such as carbon black, carbon fiber, glass fiber, silica, clays, calcium carbonate, bentonite, polytetrafluoroethylene (PTFE), molybdenum disulfide ($MoS_2$), and graphite. A binder may be added to the composition. Non-limiting examples of the binder include an acrylic resin binder, an acrylic polymer, and combinations thereof. The composition may be agglomerated and pressed into a desired shape, such as sheets, nanosheets, spheres, flakes, pellets, and powder. The composition including the carbon nitride may be added to a housing configured for receiving fluid flow.

In some embodiments, the carbon nitride material may comprise a portion of a filter. In other embodiments, the carbon nitride may comprise a membrane material comprising a permeable material such as a porous foam or fiber with the carbon nitride material disposed on or within the permeable material. The filter or the membrane may comprise between about five percent by weight (5 wt. %) to about one hundred percent by weight (100 wt. %) carbon nitride. In some embodiments, the carbon nitride may comprise between about five percent by weight (5 wt. %) about fifteen percent by weight (15 wt. %), between about fifteen percent by weight (15 wt. %) and about thirty-five percent by weight (35 wt. %), or between about thirty-five percent by weight (35 wt. %) and about fifty percent by weight (50 wt. %) based on the total weight of the filter or membrane. The carbon nitride material may be used to treat industrial wastewater. For example, as described above with reference to FIG. 5, water to be treated may be passed through a filter or membrane comprising the carbon nitride material to remove contaminants from the water.

Figure 6:
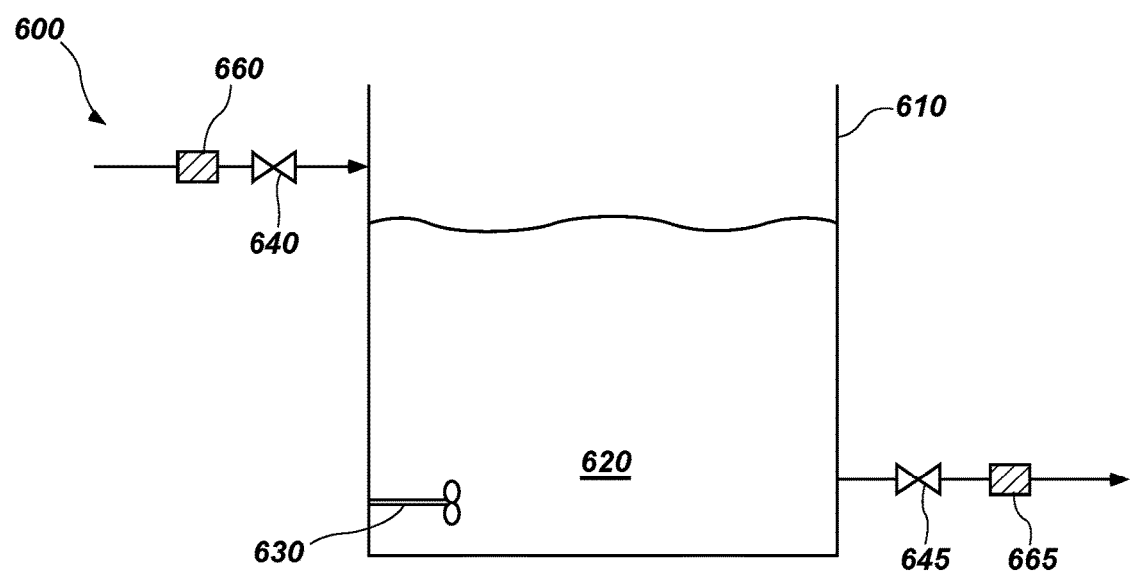
FIG. 6 schematically illustrates a system for removing contaminants from a fluid using a carbon nitride material.

Referring to FIG. 6, a system 600 including an aboveground water storage pit or tank 610 is shown. The tank 610 may be at least partially filled with a flowback fluid 620 containing contaminants. The tank 610 may include one or more mixers 630 for mixing the flowback fluid 620. A valve 640 may be located at the inlet of the tank 610 and a valve 645 may be located at the outlet of the tank 610. The outlet of the tank 610 may also include a pump (not shown) for pumping the flowback fluid 620 out of the tank 610.

In some embodiments, the flowback fluid 620 may be treated by adding carbon nitride to the tank 610. The carbon nitride may be mixed into the flowback fluid 620 with mixer 630 to cause the carbon nitride to adequately contact the flowback fluid 620. The carbon nitride may capture (i.e., scavenge) contaminants of the flowback fluid 620 in the tank 610. The pH of the flowback fluid 620 may be controlled within a range between about 6.0 and about 8.0 to optimize removal of the contaminants.

The system 600 may include a carbon nitride material 660 within the inlet piping to the tank 610 and another carbon nitride material 665 within the outlet piping of the tank 610. The carbon nitride material 660, 665 may be similar to the carbon nitride as described above with reference to 560 in FIG. 5. Thus, the flowback fluid 620 may be treated as it enters and/or exits the tank 610 in addition to being treated within the tank 610.

EXAMPLE

A mixture was prepared by spiking a water sample with a standard solution of heavy metals. The solution included heavy metal cations and other ions, including boron, barium, chromium, copper, iron, potassium, magnesium, manganese, molybdenum, sodium, nickel, lead, sulfate, silicon, titanium, and zinc. The solution was prepared with an original pH of about 1.7.

A second solution was prepared from the first solution by treating the first solution with 50% NaOH to increase the pH to approximately 6.98. Each of the first and second solution were filtered through a 25 μm filter. Then, each of the first and second solutions was treated with approximately 1 gram of carbon nitride nanoparticles. A significant decrease in the concentration of particular cations was observed after treating the solutions with the carbon nitride nanoparticles. The results are shown in Table 1 below.

TABLE 1

| | Carbon nitride treatment at pH of 1.7 and pH of 6.98 | | | | | |
|---|---|---|---|---|---|---|
| Ion | pH = 1.7 Pre-treatment concentration (ppm) | pH = 1.7 Concentration after treating (ppm) | pH = 1.7 Percent reduction by treatment | pH = 6.98 Pre-treatment concentration (ppm) | pH = 6.98 Concentration after treating (ppm) | pH = 6.98 Percent reduction by treatment |
| B | 12.09 | 11.76 | 3 | 12.08 | 11.56 | 8 |
| Ba | 4.19 | 3.90 | 7 | 4.10 | 3.67 | 13 |
| Cr | 3.89 | 2.28 | 41 | 2.34 | 0.44 | 89 |
| Cu | 3.50 | 1.18 | 66 | 2.11 | 0.34 | 90 |
| Fe | 10.00 | 4.03 | 60 | 8.97 | 0.47 | 97 |
| K | 1300 | 1270 | 2 | 1317 | 1278 | 5 |
| Mg | 1471 | 1457 | 1 | 1449 | 1417 | 6 |
| Mn | 2.56 | 2.42 | 5 | 2.12 | 1.40 | 48 |
| Mo | 3.00 | 1.52 | 49 | 3.23 | 2.39 | 37 |
| Na | 64470 | 63720 | 1 | 65540 | 63580 | 6 |
| Ni | 4.07 | 3.33 | 18 | 3.34 | 1.50 | 64 |
| Pb | 3.51 | 2.63 | 25 | 2.11 | 0.46 | 87 |
| $SO_4$ | 175 | 174 | 1 | 179 | 174 | 5 |
| Si | 6.73 | 5.30 | 21 | 4.80 | 3.34 | 50 |
| Ti | 4.49 | 2.36 | 47 | 2.79 | 0.54 | 89 |
| Zn | 7.88 | 5.82 | 26 | 5.20 | 1.20 | 85 |

Thus, the carbon nitride was effective at removing cations from a solution containing heavy metal cations. The carbon nitride more effectively removed cations from a solution having a neutral pH (pH=6.98), than from a solution having an acidic pH (pH=1.7).

While the disclosure is susceptible to various modifications and alternative forms, specific embodiments have been shown by way of example in the drawings and have been described in detail herein. However, the disclosure is not intended to be limited to the particular forms disclosed. Rather, the disclosure is to cover all modifications, equivalents, and alternatives falling within the scope of the disclosure as defined by the following appended claims and their legal equivalents.

What is claimed is:

1. An article, comprising:
    a swellable material comprising at least one of a nitrile-based elastomer, acrylonitrile butadiene styrene, polyacrylonitrile, polyurethane, polyurea, a polyamine, or combinations thereof; and
    at least one of:
        carbon nitride comprising a plurality of triazine rings, the carbon nitride within the swellable material, the swellable material comprising between about 15 weight percent and about 35 weight percent carbon nitride;
        a filter adjacent to the swellable material, the filter comprising between about 5 weight percent and about 100 weight percent carbon nitride, the carbon nitride comprising a plurality of triazine rings; and
        a membrane adjacent to the swellable material, the membrane comprising between about 15 weight percent and about 35 weight percent carbon nitride, the carbon nitride comprising a plurality of triazine rings.

2. The article of claim 1, wherein the swellable material further comprises at least one absorbent material.

3. The article of claim 1, wherein the swellable material further comprises a cellulose material.

4. The article of claim 1, wherein the swellable material further comprises at least one of carbon black, graphite, carbon fiber, glass fiber, silica, a clay, calcium carbonate, bentonite, polytetrafluoroethylene, and molybdenum disulfide.

5. The article of claim 1, wherein the filter comprises between about 15 weight percent and about 35 weight percent carbon nitride.

6. The article of claim 1, wherein the filter comprises between about 35 weight percent and about 50 weight percent carbon nitride.

7. The article of claim 1, wherein the carbon nitride is functionalized with alkyl groups, vinyl groups, epoxide groups, silane groups, carboxyl groups, pyridine groups, phenolic groups, or combinations thereof.

8. The article of claim 1, wherein the carbon nitride comprises a $C_3N_4$ polymer material.

9. The article of claim 1, further comprising an acrylic resin binder, an acrylic polymer, or a combination thereof mixed with the carbon nitride.

10. A method of forming a material, the method comprising:
    forming a swellable material comprising at least one of a nitrile-based elastomer, acrylonitrile butadiene styrene, polyacrylonitrile, polyurethane, polyurea, a polyamine, or combinations thereof; and
    at least one of:
        mixing carbon nitride with the swellable material, the swellable material comprising between about 15 weight percent and about 35 weight percent carbon nitride, the carbon nitride comprising a plurality of triazine rings;
        forming a filter comprising carbon nitride adjacent to the swellable material, the filter comprising between about 5 weight percent and about weight percent carbon nitride, the carbon nitride comprising a plurality of triazine rings; and
        forming a membrane comprising carbon nitride adjacent to the swellable material, the membrane comprising between about 15 weight percent and about 35 weight percent carbon nitride, the carbon nitride comprising a plurality of triazine rings.

11. The method of claim 10, further comprising reacting terminal amino groups of the carbon nitride with polyurethane, polyurea, a polyamine, or combinations thereof.

12. The article of claim 1, wherein the carbon nitride is functionalized.

13. The article of claim 1, wherein the carbon nitride includes terminal amino groups and terminal hydroxyl groups.

14. The article of claim 1, wherein the swellable material further comprises an ion exchange material comprising a polymer comprising protonated cations or a zeolite.

15. The article of claim 1, wherein the swellable material further comprises an ion exchange material.

16. The article of claim 1, wherein the swellable material further comprises functionalized graphene.

17. The article of claim 1, wherein the swellable material further comprises an ion exchange material comprising an organic polymer.

* * * * *